R. HAWKINS.
Grain and Seed Separator.

No. 105,451.  Patented July 19, 1870.

Witnesses
Thos Johns
Saml Hopkins

Inventor
Reason Hawkins
By N. Crawford
his atty.

United States Patent Office.

REASON HAWKINS, OF SUGAR CREEK, INDIANA.

*Letters Patent No. 105,451, dated July 19, 1870.*

IMPROVEMENT IN GRAIN AND SEED-SEPARATORS.

The Schedule referred to in these Letters Patent and making part of the same

*To whom it may concern:*

Be it known that I, REASON HAWKINS, of Sugar Creek, in the county of Hancock in the State of Indiana, have invented certain Improvements in Grain and Seed-Separators, of which the following is the specification.

In the drawings—

Figure 1:
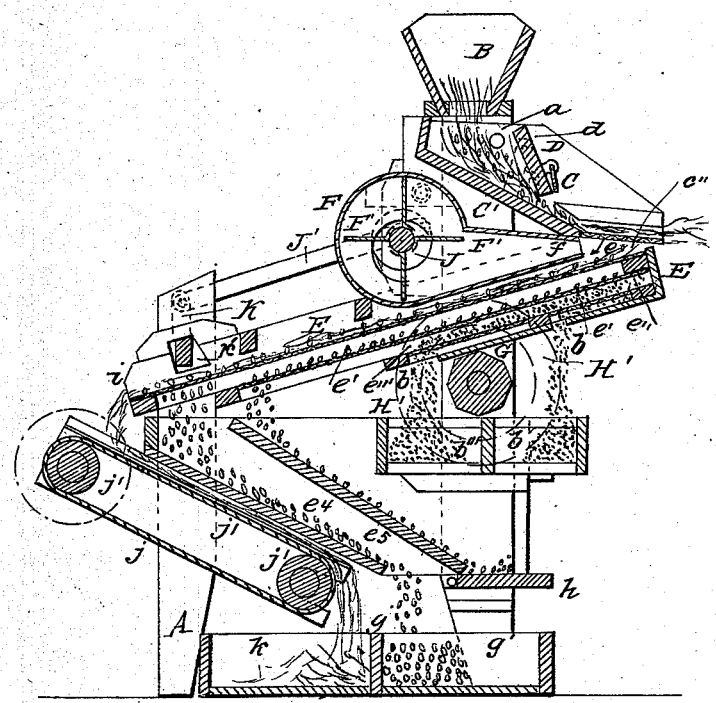
Figure 1 is an upright section showing the parts of the machine.
Figure 2:
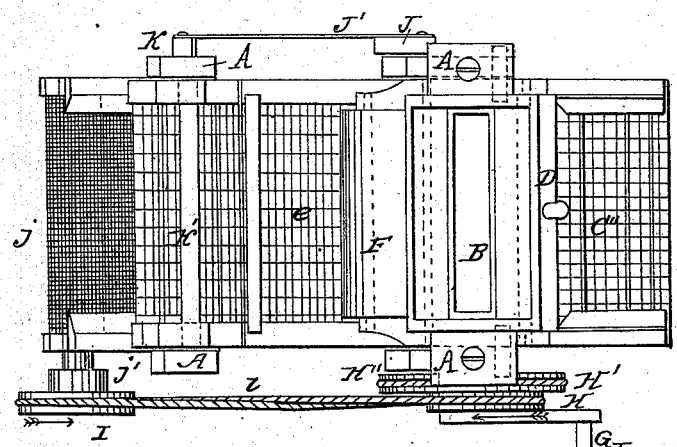
Figure 2 is a top plan view of the same.

The object of this invention is to supply a machine for the more perfect separation of wheat or other grains from chaff, straw, and the seeds of weeds that are detrimental if left with the wheat, and it is intended as an improvement upon a patent granted to me July 2, 1867, and numbered 66,333; and It consists in the construction and arrangement of chute, trash-sieve, separating-sieves, and the means used for operating them.

It also consists of the use of an endless apron, in combination with the means by which it is operated.

A represents the usual supporting-frame, surmounted by the receiving hopper B, which receives the grain in the chaff, with the seeds, as they come from the thrasher.

From hopper B these all pass into chute C, which is made with an inclined back, C', swinging and adjustable front D; and trash-sieve C'' is pivoted near its top at $a$ to frame A, and rests at its bottom end upon the upper end of sieve-box E.

Sieve-box E contains three sieves of different sized meshes, placed in an inclined position, and one over the other, and it is supported by and rests upon an octagonal shaft, G, above the center of its length, and near its lower end it is suspended upon a rock-shaft, K', which passes transversely through its sides near to its upper edge.

The upper sieve $e$, in box E is longer than the one next below it, by extending further down at the tail end of the box, while the middle sieve $e'$, in like manner, is longer, and extends further down than the lower or bottom one $e''$.

The upper sieve $e$ has larger meshes than the middle one $e'$, and large enough to let all the grain pass through it, while the lower sieve is divided into two sections $e''$ and $e'''$. The upper section $e''$ is finer in mesh than the lower one $e'''$, which is finer than $e'$.

$j$ is an endless apron, working over two revolving shafts, $j'$.

Upon the octagonal shaft G are pulleys H and H', and at the end of shaft G is the crank-winch G'.

A band goes around pulley H', on shaft G, over pulley H'' on the shaft of the fan-blower F', which is secured in the usual way, and to operate in fan-blower case F.

On the opposite end of the fan-blower shaft is a crank-wheel, J, which revolves with the fan-blower.

From this crank-wheel is a connecting-rod, J', going to and connecting with a crank-arm, K, on rock-shaft K', which rock-shaft is journaled into frame A, and supports the lower end of sieve-box E, and gives to sieve-box E a longitudinal or reciprocating motion.

A band goes over pulley H on shaft G, and to pulley I on shaft $j'$, and thereby gives motion to the endless apron $j$ on shaft $j'$.

The operation of the machine is as follows:

After filling the receiving-hopper with the uncleaned grain, take hold of the crank-winch G' and turn it in the direction indicated by the arrows, motion will be communicated from shaft G, through pulley H and its band, to pulley H'' and fan-blower F' in case F, when a strong current of air is forced by blower F' through the contracted aperture at $f$ of case F, where it comes in contact with the grain, chaff, short straw, and seeds, on the trash-sieve C'', that has passed through hopper B and chute C, by the adjustable opening under pivoted front D, and forces its way through and underneath the trash-sieve C'', blowing away the straw and chaff, leaving the kernels of grain and small seeds to fall through the trash-sieve and current of air onto the sieve $e$, where the separation of the grain from the small seeds commences.

By revolving the octagonal shaft G it gives a longitudinal and vertical motion to sieve-box E, and the sieves contained therein, and by chute C resting on the upper end of the sieve-box E, a rising or vibratory motion is given to that, which tends to shake the contents of the chute down upon the trash-sieve, to be subjected to the current of air.

Crank-wheel J, on the shaft of the fan-blower, through connecting-rod J', gives a vibratory motion to rock-shaft K' through the crank-arm K, which, in turn, communicates motion to the sieve-box E.

Motion is also given to the endless apron $j$ by band $l$, from pulley H to pulley I, on shaft $j'$.

When the grain and seeds have been separated by the blast of air from the chaff, and have fallen onto sieve $e$, the small seeds and some of the small grains will immediately fall through the meshes in sieve $e$ upon sieve $e'$, and, as the wheat kernels pass along down on the inclined sieve $e$, all will have fallen through it by the effect of the perpendicular and longitudinal motion given to the sieve before they reach the tail or bottom end of said sieve $e$, the largest of which fall through last, and none of the wheat-kernels will pass through sieve $e'$ unless they are very small; consequently, all the good wheat passes through sieve $e$ onto sieve $e'$, and is shaken to the bottom thereof, and falls upon inclined chute $e^4$, thence into box $g$, completely separating the wheat from the small seeds that are more or less mixed with the wheat in growing.

The small kernels of wheat and other seeds that pass through sieve $e'$, and cannot go through either sieve $e''$ or $e'''$, fall upon the chute $e^5$, and are retained at the bottom by the slide $h$ until the slide is withdrawn, when the seeds thus separated can be disposed of.

As the smaller seeds fall through sieve $e'$ onto $e''$, the smallest will pass through it and fall onto the bottom of the sieve, which, being inclined, and the motion such that it will be discharged through opening $b$ into box $b'$ underneath, the larger sized seeds that cannot pass through sieve $e''$ will travel down onto sieve $e'''$, and what goes through it falls upon the inclined bottom, and is discharged therefrom through opening $b''$, and falls into box $b'''$; and what does not pass through sieve $e'''$ is carried over the tail end, and falls upon the chute $e^5$, thence onto slide $h$.

It often happens that the blast of wind from the fan-blower does not remove all of the short straw, chaff, or light stuff from the trash-sieve $C''$; when that is the case, such straw and chaff will pass over sieve $e$ to the tail $i$, and there fall upon the endless apron $j$, which will carry and deposit it into box $k$, to be disposed of in any proper manner.

This machine is most complete in separating the seeds from grain, and it can be used with good advantage in bolting or sifting corn-meal, separating the husk of the corn from the fine meal or flour, the flour being in two grades, the finer in box $b'$ and the coarser in box $b'''$, while the bran will be discharged either in box $g$ or onto slide $h$, and answers well for a substitute for the flour-bolt in bolting the meal, which is a great convenience when the bolt is not at hand.

Having thus described my invention,

What I claim, and desire to secure by Letters Patent, is—

1. The pivoted chute C, composed of the inclined back $C'$, adjustable pivoted front piece D, and trash-sieve $C''$, constructed and arranged to operate in the manner and for the purpose herein described.

2. The combination of the sieve-box E, having sieves $e$, $e'$, $e''$, and $e'''$, and apertures $b$ and $b'$, with the octagonal shaft G, pulley J, connecting-rod $J'$, crank-arm K, and rock-shaft $K'$, in the manner and for the purpose herein described.

3. The combination of the endless apron $j$, operating as described, with the sieve-box E and sieve $e$, when said sieve-box is constructed and operated in the manner substantially as herein set forth.

REASON HAWKINS.

Witnesses:
DAVID J. ELLIOTT,
M. M. HOOK.